United States Patent [19]

Koike

[11] Patent Number: 4,486,871
[45] Date of Patent: Dec. 4, 1984

[54] CONTINUOUS REPEATING TYPE SIMPLIFIED SOUND REPRODUCING DEVICE

[75] Inventor: Eishi Koike, Sagamihara, Japan

[73] Assignee: Ozen Corporation, Tokyo, Japan

[21] Appl. No.: 568,655

[22] Filed: Jan. 6, 1984

[30] Foreign Application Priority Data

Aug. 26, 1983 [JP] Japan .............................. 58-155820

[51] Int. Cl.³ ...................... G11B 17/00; A63H 3/33
[52] U.S. Cl. ...................................................... 369/67
[58] Field of Search ...................... 369/63, 65, 66, 67

[56] References Cited

U.S. PATENT DOCUMENTS

| | | | |
|---|---|---|---|
| 3,870,318 | 3/1975 | Poynter | 369/67 |
| 3,984,111 | 10/1976 | Hughes, Jr. | 369/67 |
| 4,150,832 | 4/1979 | Watanabe | 369/67 |
| 4,164,353 | 8/1979 | Hughes, Jr. | 369/67 |
| 4,198,057 | 4/1980 | Miura | 369/67 |
| 4,347,595 | 8/1982 | Ngai | 369/67 |

*Primary Examiner*—Charles E. Frankfort
*Assistant Examiner*—Thomas P. Matecki
*Attorney, Agent, or Firm*—Basile, Weintraub & Hanlon

[57] ABSTRACT

A continuous repeating type simplified sound reproducing device including on its casing, a fixed locking lever having a locking face parallel to the plane of rotation of a record disc and a rotating locking lever on the record disc which rotates together with the record disc and is able to enter under the locking face of the fixed locking lever only when the record disc is placed at its retracted position. At least one of the locking faces of the two locking members are arranged to have a face length corresponding to the angle of rotation sufficient to maintain the record disc at its retracted position until the record disc has completely returned to the starting point of sound reproduction. By virtue of this construction, satisfactory returning motion of this continuous repeating type sound reproduction device can be assured by a comparatively simplified construction.

5 Claims, 6 Drawing Figures

CONTINUOUS REPEATING TYPE SIMPLIFIED SOUND REPRODUCING DEVICE

BACKGROUND OF THE INVENTION

1. Field of the Invention

This invention relates to a continuously playable simplified sound reproducing device.

More particularly, this invention relates to a simplified sound reproducing device of the type having a construction comprising: a fixed locking lever disposed on a casing and having a locking face placed parallel to the plane of rotation of the record disc, and a rotating locking lever disposed on the record disc and having a locking face which rotates together with the record disc and proceeds on immediately below the lower face of the locking face of the fixed locking lever only when the record disc is placed in a position retracted from its playing level. At least one of the locking faces is formed with an arc length corresponding to the angle of rotation of the record disc which is sufficient enough to maintain the record disc at its retracted position until the pickup of the device has returned to the starting point of sound reproduction.

2. Description of the Prior Art

Heretofore, there have been provided simplified sound reproducing devices capable of continuously repeating the play of a recorded item.

Such simplified sound reproducing devices function in the following manner, that is; a pickup upon its arrival at the end point of sound reproduction, urges a returning arm which is swingably disposed to engage the pickup at the end point of sound reproduction and make the returning arm ride on an upwardly facing cam, thereby urging a member imparting stylus pressure to the record disc or pickup to move by the stroke of the cam and widens the space between the record disc and the member imparting stylus pressure. This releases the stylus pressure and allows the pickup to return to the end point of sound reproduction (Refer to Japanese Patent Publication No. 45217/81).

The means for actuating return motion of the pickup to continuously repeat sound reproduction, adopted in the prior art device, requires a returning arm; which returning arm is also required to have a return spring having sufficient resiliency. This has brought about disadvantages in saving production costs due to the troublesome and time consuming assembly of a large number of parts.

Above all, the return spring for the returning arm, when it is fabricated with too strong a spring force, is liable to damage the recorded groove through the pickup or introduce such a premature disengagement with the cam means that the pickup returns to the start point of sound reproduction at an undesired stage of playing.

Thus, it has been necessary to arrange some means for adjusting engagement of the cam means with the returning cam.

It was initially conceived to lengthen the top of the cam face in the direction of rotation. However, this inevitably reduces the lower area of the cam face and makes it difficult to set the timing of the return motion of the pickup with respect to the lower area of the cam face.

The present invention aims to solve the drawbacks found in similar prior art devices.

Accordingly, an object of the present invention is to provide a means for returning the pickup which is of simplified construction and which does not rely on a returning arm and a return spring.

Another object of this invention is to provide a means for returning the pickup which can securedly maintain the record disc free from stylus pressure until the pickup has returned to the starting point of sound reproduction. A further object of the present invention is to provide a simplified sound reproducing device capable of continuously repeating sound reproduction which can be readily manufactured and assembled.

A still further object of the invention is to provide a continuous repeating type sound reproducing device which can be manufactured at a low cost.

SUMMARY OF THE INVENTION

The continuous repeating type sound reproducing device according to the present invention includes in a casing; a record disc resiliently supported by a stylus pressure spring, an upward facing cam disposed at the central part of the record disc, a speaker cone fixed to the casing, a sound transmitting member which constitutes a speaker unit together with the speaker cone, a pickup interposed between the sound transmitting member and the record disc which is imparted a stylus pressure by the stylus pressure spring and is normally urged by a return spring toward the starting point of sound reproduction of the record disc and a scooping lever fixed to the pickup so that it can ride on the cam upon arrival of the pickup at the end point of sound reproduction.

When the scooping lever has ridden on the cam, the record disc is retracted against the stylus pressure spring by the lift or stroke of the cam, through the cooperation of the pickup which is supported by the sound transmitting member and the scooping lever. Thereby, the stylus pressure can be released allowing the return of the pickup to the starting point of sound reproduction.

In addition to the aforesaid construction, a fixed locking lever having a locking face parallel to the plane of rotation of the record disc is provided; while on the record disc a rotating locking lever is disposed which rotates together with the record disc and enters under the locking face of the fixed locking lever only when the record disc reaches its retracted position.

By virtue of this construction at least one locking face of these locking members is arranged to have a face length in the angle of rotation sufficient enough to let the record disc maintain its retracted position at least during the period while the record disc is able to return to the starting point of sound reproduction.

Accordingly, it has become possible by the present invention to provide a means for returning the pickup to the starting point of sound reproduction without requiring any returning arm or return spring.

Furthermore, due to the fact that the length of the top face of the cam has been shortened, accompanied with a lengthening of the remaining portion of the cam lobe, the scooping lever of the pickup has been rendered readily able to ride on the lobe on the cam, and at the same time, the record disc can be maintained free from the stylus pressure until the pickup has returned to the starting point of sound reproduction.

By this construction the pickup can perform its returning motion very exactly. In addition, assembly of the device can be simplified together with the provision of continuous repetition type of play with reduced production costs.

DESCRIPTION OF THE PREFERRED EMBODIMENTS

Figure 1:
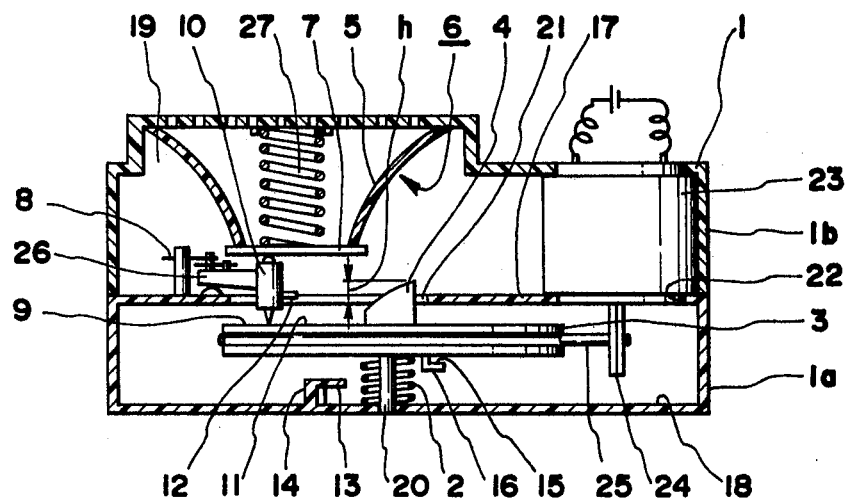
FIG. 1 and FIG. 2 are cross sectional elevation views of the continuous repeating type simplified sound reproducing device of the present invention.

In FIG. 1, a casing 1 consists of a chassis 1a and a housing 1b. The chassis 1a comprises a portion forming a bottom plate 18 and a middle deck 17 which is supported above and spaced apart from the bottom plate 18. The housing 1b also includes, at its upper part, a portion which constitutes a speaker box 19.

Within the chassis 1a and on the bottom plate 18, a center pin 20 is fixedly disposed upright, around which a record disc 3 integrally formed with a turn table is received. The record disc 3 is freely movable in the direction of rotation and in upward and downward reciprocal directions as well. The outer circular face of the record disc 3 is formed to constitute a pulley groove. In addition, the record disc 3 further includes, at the center on the upper surface, an upwardly facing cam 4 which is integrally formed with the record disc and a rotating locking lever 16 having an "L" shaped profile which is disposed downward from the reverse face of the turn table at a position spaced apart at a suitable distance from the center of the turn table.

One arm of the locking lever 16 extends radially outward. The upper face of the arm constitutes a locking face 15.

The record disc 3 also has a starting point of sound reproduction 9 at its periphery and an end point of sound reproduction near the center of the disc. The center pin 20 is disposed to pass through the record disc 3 and the upwardly facing cam 4.

A stylus pressure spring 2 formed as a coil spring is disposed below the reverse face of the record disc 3 and around the center pin 20 and resiliently urges the record disc 3 upward.

A fixed locking lever 14 having the shape of an inverted capital letter "L" is disposed within the chassis 1a in such a manner that its one arm stands up from the upper face of the bottom plate 18 and its other contiguous arm extends radially inward.

The forward end of the radially extending arm of the fixed locking lever 14 extends further inward passing over the locus of the forward tip end of the rotating locking face 15 of the rotating locking lever 16 and has an arc length "1" slightly longer than that of the top face of the cam 4.

The extent or length of the depending portion of the rotating locking lever 16 and the upward pointing part of the fixed locking lever 14, respectively, is determined such that the locking face 15 takes a position below the locking face 13 of the fixed locking lever 16, when the locking face 15 is lowered by cam action by the length "h" corresponding to the lift "h" of the cam face 4 from the lowest point of the cam stroke to the top of the cam face 4. (Refer to FIG. 2)

The middle deck 17 has two apertures 21 and 22, one aperture 21 having a length larger than the radius of the record disc 3 and positioned near the center of the record disc and another aperture 22 for a driving motor.

In the drawing, numeral 23 denotes a motor fixed on the middle deck 17 adjacent to the aperture 22. The output shaft 24 of the motor extends downward such that its side peripheral faces are in parallel with the side face of the record disc 3 constituting the pulley groove as mentioned above. A resilient belt 25 extends between the output shaft 24 and the record disc 3.

On the middle deck 17, a tone arm 26 is disposed being swingably received for free swing motion both parallel to and away from the recorded face of the record disc 3. A pickup 10 is integrally formed at the distal end of the tone arm 26. The tone arm 26 is also provided at its pivotal portion with a return spring 8 so that the pickup 10 can normally be urged toward the starting point of sound reproduction and move away from the recorded face of record disc 3.

A speaker unit 6 is disposed above the pickup 10 and is fixedly attached to the inner face of the speaker box 19 of the housing 1b. The speaker unit 6 consists of a speaker cone 5 and a plate-like sound transmitting member 7 fixed to the head of the speaker cone (at the lower end in the drawing). The upper end of the pickup 10 slidable contacts the lower face of the sound transmitting member 7.

A supporting spring 27 in the form of a coil spring compressed between the reverse face of the speaker box 19 and the upper face of the sound transmitting member 7 to resiliently bias the sound transmitting member 7 toward the record disc 3.

By virtue of this construction, the pickup 10 is urged by the sound transmitting member 7 to advance into the chassis 1a by passing through the aperture 21 defined in the middle deck 17. Thereby, the sound reproducing stylus of the pickup 10 can engage the recorded face of the record disc 3 unless prevented by some means from lowering down to the recorded face.

A scooping lever 12 projects radially from the side face of the pickup 10 and confronts the upwardly facing cam 4.

Explanation will now be made on the operation of this embodiment of the device of the present invention.

As shown in FIG. 1, the record disc 3, having been urged and raised upward by the resilient force of the stylus pressure spring to an advanced position, engages the sound reproducing stylus of the pickup 10. The top of the pickup 10 slidably contacts the lower face of the sound transmitting member 7 of the speaker unit 6, such that the pickup 10 is interposed between the recorded face of the record disc 3 and the lower face of the sound transmitting member 7.

FIG. 1 shows the state where the motor 23 has started rotation in the above-mentioned position, such that the record disc 3 has rotated and the pickup 10 has moved only a short distance toward the end point of sound reproduction 11 against the resilient force of the return spring. Under this condition, the record disc 3 continues to rotate accompanied by rotation of the locking face 15 of the rotating locking face 16 above the upper face of the fixed locking lever 14.

Figure 2:
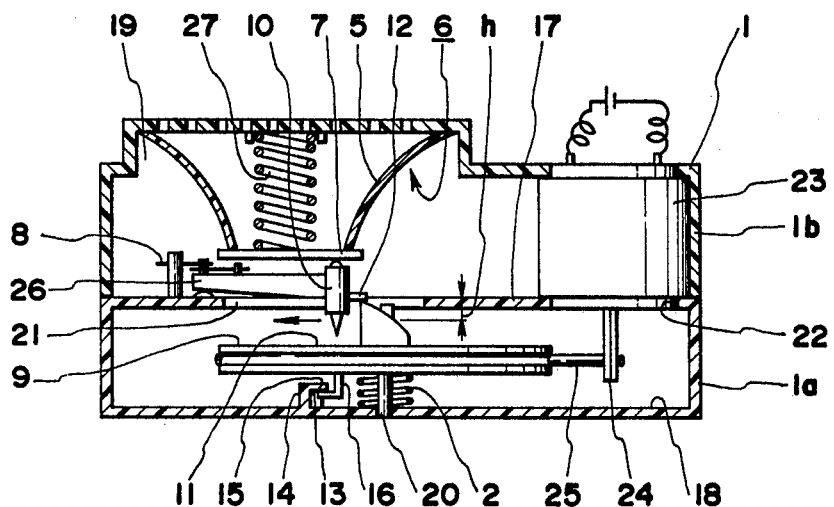

As sound reproduction of the recorded item proceeds, the pickup 10 reaches the end point of sound reproduction 11. At this point, the scooping lever 12 is raised from the lower position of the upward facing cam 4 to the top position of the cam by a distance equal to height "h" as shown in FIG. 2. Since the pickup 10 is sustained by the sound transmitting member 7, the record disc 3 is forced to be relatively retracted, that is, lowered by the distance "h" against the bias of the stylus pressure spring 2.

Figure 3:
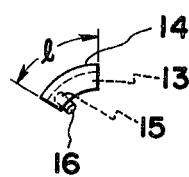
FIG. 3 is a partly sectioned plan view showing the fixed locking lever and the rotating locking lever.

Then the locking face 15 of the rotating locking lever 16 is shifted to a level wherein the locking face 15 rotates below the locking face 13 of the fixed locking lever 14. As shown in FIG. 3, the locking face 13 of the fixed locking lever 14 is formed to have an arc length "1" in the direction of rotation which is slightly longer than the length of the top of the upward facing cam 4 in the direction of rotation. As the result, the locking face 13 can prevent the record disc 3 from advancing, that is, raising until the top of the cam 4 has turned through a rotational angle to the position where the cam 4 can release the scooping lever 12 from its raised position. In this way, the pickup 10 can revert back to the starting point of sound reproduction as shown by the thick arrow line in FIG. 2.

Figure 4:
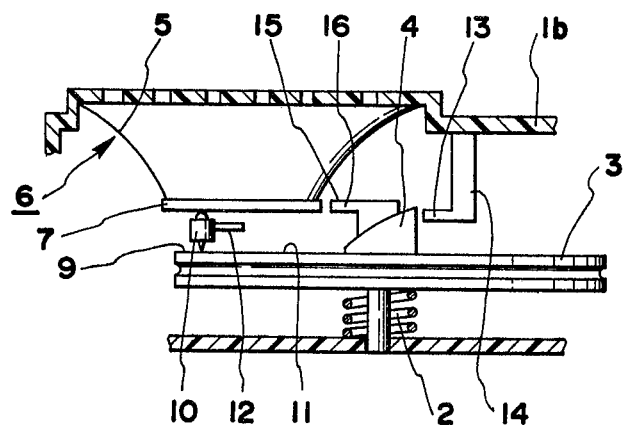
FIG. 4 and FIG. 5 are cross sectional elevation views of another embodiment of the simplified sound reproducing device of the present invention.
Figure 5:
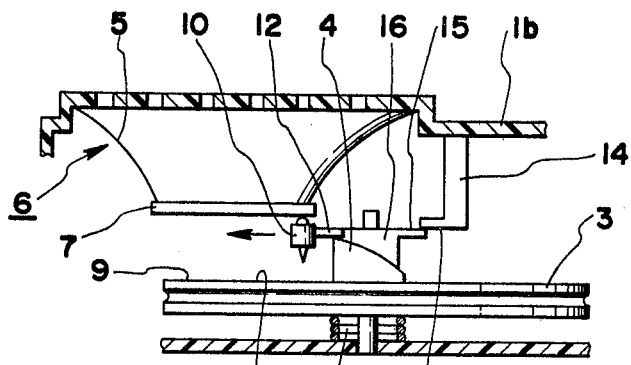
Figure 6:
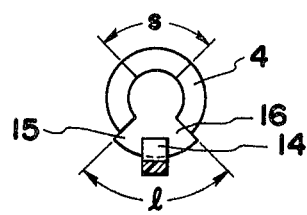
FIG. 6 is a partly sectioned plan view showing the fixed locking lever and the rotating locking lever of the embodiment shown by FIGS. 4 and 5.

FIG. 4 to 6 show a second embodiment of the present invention.

In this embodiment only the construction of the fixed locking lever 14 and the rotating locking lever 16 differ from that described in the aforesaid example, so explanation will be made only on these differences by omitting the construction of the remaining parts or components.

In this embodiment, the rotating locking lever 16 is disposed eccentrically on the central part of the record disc 3 and the locking face 15 is formed on the upper face of the locking lever 16. On the other hand, the fixed locking lever 14 depends from the reverse face of the cover plate of the housing 1b and is in the form of a reverse capital letter "L". The upper face of the horizontal member of the fixed locking lever 14 is kept below the upper face 16 of the rotating locking lever 16.

As shown in FIG. 5, upon arrival of the pickup 10 at the end point of reproduction, the scooping lever 12 attached to the pickup 10 is scooped upward by the upward facing cam 4 until it reaches the top of the cam 4, where the locking face 15 of the rotating locking lever 16 is positioned immediately below the locking face 13 of the fixed locking lever 14.

In this position, the record disc 3 is retracted (lowered) against the resilient force imparted by the stylus pressure spring 2 and thereby releases the stylus pressure which has been applied via the pickup 10. Since the locking face 15 of the rotating locking lever 16 is formed to have an arc length "1" larger than that of the cam face 4 corresponding to the angle of rotation as shown in FIG. 6, the record disc 3 can stil be securedly released from the stylus pressure until the pickup 10 has returned to the starting point of sound reproduction as shown by the thick arrow line shown in FIG. 5, even when the upward facing cam 4 has rotated further and has lost its holding effect on the pickup 10.

What is claimed is:

1. A continuous repeating type simplified sound reproducing device comprising:
   a casing;
   a stylus pressure spring disposed within the casing;
   a record disc having a recorded groove with starting and end points of sound reproduction resiliently supported in the casing by the stylus pressure spring;
   an upwardly facing cam disposed at a central part of the record disc;
   a speaker cone fixedly mounted in the casing;
   a sound transmitting member disposed within the casing and forming a speaker unit with the speaker cone;
   a pickup interposed between the record disc and the sound transmitting member, the stylus pressure spring imparting a stylus pressure on the pickup;
   a return spring disposed within the casing, the return spring normally biasing the pickup towards the starting point of sound reproduction on the record disc;
   a scooping lever fixed on said pickup, the scooping lever riding along the cam upon arrival of the pickup at the end point of sound reproduction on the record disc such that the scooping lever urges the record disc to retract against the force of the stylus pressure spring by the height of the cam so as to release stylus pressure on the pickup and permit returning of the pickup to the starting point of sound reproduction on the record disc;
   a fixed locking lever disposed in the casing and having a locking face disposed parallel to the plane of rotation of the record disc;
   a rotating locking lever disposed on the record disc and having a locking face parallel to the plane of rotation of the record disc and rotatable together with the record disc, the rotating locking lever entering below the locking face of the fixed locking lever only when the record disc is in a retracted position; and
   at least one of the locking faces of the fixed and rotating locking levers having a locking face length corresponding to the angle of rotation sufficient to maintain the record disc at its retracted position at least until the pickup has returned to the starting point of sound reproduction on the record disc.

2. The continuous repeating type simplified sound reproducing type as claimed n claim 1 wherein the fixed locking lever is disposed on a bottom inner face of the casing and the rotating locking lever is disposed on the reverse face of the record disc.

3. The continuous repeating type simplified sound reproducing device as claimed in claim 1 wherein the fixed locking lever is disposed on a inner face of the upper plate of the casing and the rotating locking lever projects radially from the central part of the record disc.

4. The continuous repeating type simplified sound reproducing device as claimed in claim 1 wherein the fixed locking lever is disposed on a bottom inner face of the casing and the rotating locking lever is disposed on the reverse face of the record disc and the locking face of the fixed locking lever has a face length corresponding to the angle of rotation sufficient enough to maintain the record disc at its retracted position at least during the period until the pickup has returned to the starting point of sound reproduction.

5. The continuous repeating type simplified sound reproducing device as claimed in claim 1 wherein the fixed locking lever is disposed on an inner face of an upper plate of the casing and the rotating locking lever projects radially from the central part of the record disc and the locking face of the rotating locking lever has a face length corresponding to the angle of rotation sufficient enough to maintain the record disc at its retracted position at least during the period until the pickup has returned to the starting point of sound reproduction.

* * * * *